Feb. 21, 1928.
C. M. MOHLER
1,659,829
REPAIRMAN'S CREEPER
Filed Nov. 17, 1926
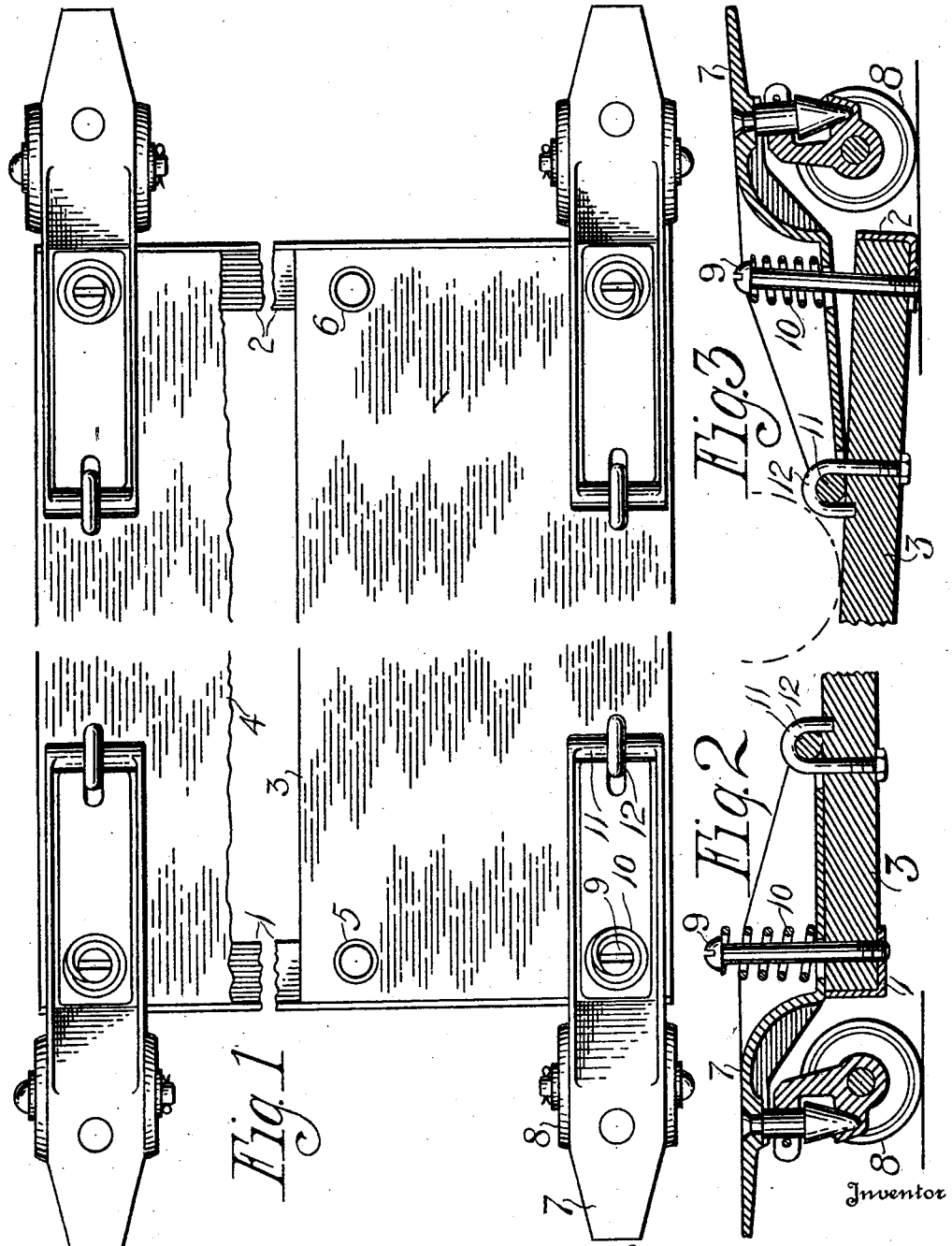
Inventor
Charles M. Mohler,
By Edwin Guthrie,
Attorney Patented Feb. 21, 1928.

1,659,829

UNITED STATES PATENT OFFICE.

CHARLES M. MOHLER, OF YPSILANTI, MICHIGAN.

REPAIRMAN'S CREEPER.

Application filed November 17, 1926. Serial No. 148,925.

This invention relates to repairmen's creepers, that term being used in the automobile trade to designate low trucks provided with a bed and casters whereby the bed may be moved about in any direction upon a floor beneath a machine in the process of repair. The object of this invention is to provide a spring suspension for the bed which will protect the creeper from being broken or otherwise damaged by being run over by a heavy car or truck. The intention is to produce a flat bed creeper which will be practically free from liability to damage by being run over, by reason of the fact that the rolling supports for the bed are constructed to yield and allow the bed under excess weight thereon to descend into contact with the floor. Furthermore, such creepers are usually subjected to rough handling in repair shops and the like, and are often thrown about on the concrete floors. It is believed that a creeper constructed in accordance with this invention will successfully resist destruction either from being run over or upon or from being knocked about in regular service.

The preferred form of construction and arrangement of the parts of this invention are illustrated in the accompanying drawings forming a part of this application for patent, and Fig. 1 of the drawings represents a plan view. Fig. 2 is a vertical section through one of the supporting casters and a portion of the bed. Fig. 3 is a like section showing the bed forced down into contact with the floor and the caster body pivotally inclined.

Throughout the description and drawings the same number is used to refer to the same part.

Considering the drawings, the angle irons 1 and 2 form the ends of the bed which may consist of the boards 3 and 4 of wood. Bolts 5 and 6 may be used to secure the boards to the end irons. It is not intended to limit this invention to the bed construction illustrated, as any bed construction suitable could be substituted.

Each caster is of the same construction. The body 7 projects over the end of the bed as shown and is provided with the wheels 8, the caster being of the character that will allow the bed to be moved about upon the floor in any direction. A bolt 9 passes upwardly through the bed board 4, and it will be noted that the lower end of the bolt 9 is in threaded engagement with the end angle iron 1. That engagement prevents the bolt from being pulled out upwardly. Encircling the bolt 9 is a coil spring 10, and by reason of its bearing against the head of the bolt 9 the spring directly carries the weight of the bed. As stated, one end of the body 7 of the caster projects beyond the end of the bed, and the other end of the body is provided with a cylindrical terminal 11 secured to the bed by a hook bolt 12.

While the parts and their disposition above described are advantageous for the purpose desired, it is believed to be within the purview of this invention to modify the revoluble supporting devices for the bed as may be desired. It is believed to be obvious that the construction herein set forth is susceptible of numerous changes by any skilled workman, such as the introduction of flat and leaf springs, rubber and the like. Furthermore, the pivot pin of the caster could manifestly be mounted in a cylindrical socket and provided with the spring or rubber cushion which would permit the bed under over weight to descend into contact with the floor.

Having now described this invention, it will now be understood that in the operation should an automobile wheel run upon the bed as indicated by the broken lines in Fig. 3, the spring 10 yields and the end of the bed descends into contact with the floor. Neither the spring nor the bed are injured. As soon as the wheel of the machine is removed the springs 10 restore the bed to its normal position. The bed in practice is ordinarily of such extent as will enable a workman to lie thereon and work upon the parts of a machine above him.

I claim and desire to secure by Letters Patent of the United States:—

1. In a repairman's creeper, the combination with a bed, of revoluble supports for the bed whereby the same may be moved upon a floor in any direction, means for connecting the said supports with the bed at a distance above the bed, the said connecting means including springs arranged to carry the bed and adapted to be compressed by excess weight upon the bed allowing the bed to descend into contact with the floor.

2. In a repairman's creeper, the combination with a bed, of revoluble supports for the bed whereby the same may be moved upon a floor in any direction, means arranged above the bed for connecting the said supports with the bed, the said connecting means including springs for carrying the bed and adapted to be compressed by excess weight upon the bed allowing the bed to descend into contact with the floor.

3. In a repairman's creeper, the combination with a bed, of a caster having a body portion arranged with one end projecting beyond the edge of the bed, wheels borne by the said body and attached to the projecting end whereon the bed may be moved upon a floor in any direction, means for pivotally connecting the other end of the said body with the bed, a spring arranged upon the said body, and connecting means arranged above the bed whereby the spring carries the weight of the bed and excess weight pivotally inclines the said body and allows the bed to descend into contact with the floor.

4. In a repairman's creeper, the combination with a bed, of a caster having a body portion arranged with one end projecting beyond the edge of the bed and provided with wheels whereon the bed may be moved upon a floor in any direction, the other end of the said body being provided with a cylindrical terminal, means for connecting the said terminal pivotally with the said bed, a spring arranged upon the said body of the caster, means arranged above the bed for connecting the said spring and the body whereby the spring is connected with the bed and carries the weight of the bed and excess weight upon the bed inclines the said body of the caster and allows the bed to descend into contact with the floor.

In testimony whereof I affix my signature.

CHARLES M. MOHLER.